United States Patent [19]

Martin et al.

[11] Patent Number: 5,459,211

[45] Date of Patent: Oct. 17, 1995

[54] PROCESS FOR THE RADICAL POLYMERIZATION OF VINYL CHLORIDE AT ACID PH IN AQUEOUS DISPERSION

[75] Inventors: Roland Martin, Bruxelles; Stéphane Noel, Grimbergen, both of Belgium

[73] Assignee: Solvay (Société Anonyme), Brussels, Belgium

[21] Appl. No.: 322,765

[22] Filed: Oct. 13, 1994

[30] Foreign Application Priority Data

Oct. 21, 1993 [BE] Belgium ............................ 09301120

[51] Int. Cl.$^6$ ............................ C08F 2/40; C08F 114/06
[52] U.S. Cl. ............................ 526/82; 526/83; 526/344.2
[58] Field of Search ............................ 526/82, 83, 344.2

[56] References Cited

U.S. PATENT DOCUMENTS 3,642,756  2/1972  Meeks et al. ............................ 260/92.8
3,691,080  9/1972  Bauer et al. ............................ 526/344.2
3,790,542  2/1974  Koyanagi et al. ............................ 526/344.2

FOREIGN PATENT DOCUMENTS 837070  12/1975  Belgium .

Primary Examiner—Joseph L. Schofer
Assistant Examiner—Tom Weber
Attorney, Agent, or Firm—Spencer, Frank & Schneider

[57] ABSTRACT

The temperature of the polymerization medium of vinyl chloride with the involvement of oil-soluble initiators is controlled essentially by direct and modified injection of an effective amount of a strong inorganic inhibitor of radical polymerization or of a precursor advantageously chosen from iodine and nitrogen monoxide, as well as from alkali metal iodides and nitrites, which are the respective precursors of iodine and of nitrogen monoxide.

9 Claims, No Drawings

PROCESS FOR THE RADICAL POLYMERIZATION OF VINYL CHLORIDE AT ACID PH IN AQUEOUS DISPERSION

The present invention relates to a process for the radical polymerization of vinyl chloride at acid pH in aqueous dispersion. It more particularly relates to a process in which the radical polymerization is initiated using oil-soluble initiators and the temperature of the polymerization medium is directly adjusted.

The radical polymerization of vinyl chloride involving oil-soluble initiators of the radical polymerization constitutes a well-known polymerization technique for the manufacture of vinyl chloride polymers. It is generally carried out non-continuously and at acid pH with adjustment of the temperature of the aqueous polymerization medium via a double jacket surrounding the reactor in which circulates a coolant fluid, most often water. However, the rate of the polymerization reaction of vinyl chloride and consequently the amount of heat to be removed from the reactor is not generally constant throughout the polymerization cycle. It is well known that a self-acceleration phenomenon takes place, generally shortly before or at the beginning of the pressure fall, when the medium is rich in gel phase and is not yet depleted in vinyl chloride, which is reflected by a peak in the temperature of the coolant fluid circulating in the double jacket. This self-acceleration phenomenon becomes more significant as the polymerization temperature becomes lower. The problem in question is thus particularly acute in the manufacture of high molecular weight vinyl chloride polymers. In standard practice, the amount of initiator used is thus set at a value such that control of the polymerization temperature is retained during the period where the self-acceleration phenomenon is most intense. In this case, an underuse of the coolant capacity of the reactors during the first part of the polymerization cycle is accepted. These measures are essential for reasons of safety, quality and reproducibility of the quality of the resins.

Various means have already been proposed for improving the productivity of polymerization reactors of vinyl chloride in aqueous dispersion. Among the latter appears the use of oil-soluble initiator systems comprising a rapid initiator, used at a low dose, and another, less rapid, initiator used at a higher dose (cf., for example, Belgian Patent 756,976, filed on 2 Oct. 1970). However, the improvement in the productivity is not very significant, given the absolute necessity of limiting the amount of rapid initiator so that the latter is entirely consumed before the self-acceleration phenomenon becomes significant and risks making it difficult to thermally control the polymerization reactor.

It has also already been proposed to improve the productivity of the reactors by the injection, into the polymerization medium, of compounds which retard the polymerization, also known as "peak suppressors", such as, for example, hydroquinone or hydroxyphenol compounds (cf., for example, U.S. Pat. No. 3,642,756). These polymerization retarders, which exhibit a weak to moderate inhibiting effect of the radical polymerization of vinyl chloride, have a persistent action and, moreover, one which increases with the degree of conversion. Although they effectively make it possible to straighten out the temperature profile to a certain degree, more particularly at the time of the "peak", they nevertheless have the disadvantage of slowing down the polymerization in the pressure fall stage when the polymerization slows down due to the depletion of the medium in vinyl chloride. In this case again, the improvement in the productivity is not very high.

The present invention is targeted at providing an improved process which makes it possible to thermally control the polymerization of vinyl chloride with a very significant improvement in the productivity of the polymerization reactor.

To this end, the invention relates to a process for the radical polymerization of vinyl chloride at acid pH in aqueous dispersion with the involvement of oil-soluble initiators, characterized in that the temperature of the polymerization medium is essentially controlled by direct and modified injection of an effective amount of a strong inorganic inhibitor of the radical polymerization or a precursor of such an inhibitor.

Strong inorganic inhibitor of the radical polymerization is understood to denote, for the purposes of the present invention, any inorganic compound which causes, at a single, very low dose, i.e. a single dose which does not exceed approximately 25 parts by weight per million (ppm) with respect to the vinyl chloride, the polymerization to completely and instantaneously halt for a limited period of time. In practice, the time for which the polymerization is halted is directly proportional to the amount of inhibitor used and inversely proportional to that of the initiator.

In contrast to the strong inorganic inhibitors as defined above, the polymerization retarders of the prior art are weak inhibitors which lead, under the same conditions, only to a slowing down in the polymerization with a longer-lasting effect.

Mention may be made, as examples of strong inorganic inhibitors which can be used in the process of the invention, of iodine and nitrogen monoxide and their respective precursors, in this case alkali metal iodides and nitrites. Precursor is understood to denote compounds capable of forming the strong inhibitor in situ under the conditions of the polymerization. Thus it is that, under the conditions of the polymerization in aqueous dispersion of vinyl chloride at acid pH (that is to say, at a pH not exceeding 7), alkali metal nitrites decompose to form nitrogen monoxide. Moreover, the in situ conversion of alkali metal iodides to iodine can be obtained by addition to the reaction medium of appropriate amounts of peroxide compounds, such as, for example, hydrogen peroxide or alternatively organic peroxide compounds having a certain solubility in water.

The strong inorganic inhibitor (or its precursor) is advantageously used in the form of very dilute aqueous solutions, which makes possible very precise metering of the strong inhibitor (or of its precursor) and the thermal control of the polymerization medium by the momentary injection, at the appropriate time, of minute amounts of strong inhibitor (or of its precursor). The concentration of the aqueous solutions used is not critical. To give an idea, the latter can contain approximately from 0.1 to 5 g/l of inhibitor (or equivalent amounts of precursor), more particularly approximately from 0.5 to 2 g/l.

Due to their very high solubility in water, preference is given to the use of alkali metal iodides and nitrites, which are the respective precursors of iodine and of nitrogen oxide. Mention may be made, as examples of alkali metal iodides and nitrites, of sodium and potassium iodides and nitrites. Preference is given, among these, to the iodides. A very particularly preferred strong inorganic inhibitor is potassium iodide, which is the precursor of iodine.

As regards the establishment of an acid pH, that is to say of a pH which does not exceed 7, it is known that acidification of the vinyl chloride polymerization medium takes place spontaneously at the time of the initiation of the polymerization in the presence of small amounts of residual oxygen. If necessary, the acid pH of the polymerization medium can be established by acidification using non-oxidizing acids, such as hydrochloric, sulphuric or phosphoric acids, used in appropriate amounts.

The overall amount of strong inhibitor to be used per polymerization cycle will, of course, depend in each specific case on the general conditions of the polymerization and, in particular, on the polymerization temperature and on the nature and the amount of oil-soluble radical initiator. By way of indication, the overall amount of strong inorganic inhibitor to be used for the direct control of the temperature of the polymerization medium during a polymerization cycle will not generally exceed approximately 75 ppm and most often it will not exceed approximately 60 ppm (or the equivalent amounts of precursor) with respect to the vinyl chloride used. Moreover, the overall amount of strong inorganic inhibitor to be used during a polymerization cycle will generally amount to at least approximately 2 ppm and most often approximately 5 ppm (or the equivalent amounts of precursor) with respect to the vinyl chloride used.

In the case where an inhibitor precursor is resorted to, it will, of course, be advisable to adapt the amounts in order to form in situ the appropriate amounts of strong inorganic inhibitor.

In the same way, the strong inhibitor flow rate will depend on the general conditions of the polymerization and will not be constant throughout the polymerization cycle, the inhibitor injection taking place at the time when the polymerization temperature is drifting upwards. As a general rule, the hourly flow rate of strong inorganic inhibitor will not exceed approximately 40 ppm with respect to the vinyl chloride used (or the equivalent amounts of precursor).

A noticeable advantage of the process according to the present invention thus lies in the fact that the temperature of the polymerization medium can be controlled with high precision independently of the cooling capacity available via the double jacket. As a corollary, the process according to the invention makes possible a larger initiator charge which results in a very noticeable increase in the productivity of the polymerization reactors.

The device for the modified injection of the strong inorganic inhibitor (or of its precursor) in instantaneous response to a drift in the temperature of the reaction medium is not critical. The injection of inhibitor can thus be carried out by any manual or automatic control means, if appropriate computerized, known to that end. In practice, the storage tank of the strong inorganic inhibitor (or of its precursor) will be placed under a slight positive pressure, advantageously under a nitrogen positive pressure, for example a positive pressure of approximately 1.2 bar, with respect to the pressure in the polymerization reactor. The flow rate at which the aqueous solution of the inhibitor (or of its precursor) is introduced can be adjusted, for example, via a pneumatic valve and be measured by means of a mass flowmeter.

The time at which control by direct injection of the strong inhibitor begins is not critical. Generally, direct control will be introduced as soon as the coolant in the circuit has reached a predetermined temperature threshold, for example at approximately 20° or 25° C.

Apart from the specific characteristic aspects of the process of the invention described above, the general conditions of the polymerization are those commonly used for the radical polymerization of vinyl chloride at acid pH in aqueous dispersion.

Polymerization of vinyl chloride is understood to denote, for the purposes of the present invention, both homopolymerization of vinyl chloride and its copolymerization with other ethylenically unsaturated monomers polymerizable by the radical route. Mention may be made, as examples of common comonomers of vinyl chloride which can be used in the process of the invention, of olefins, halogenated olefins, vinyl ethers or vinyl esters, as well as acrylic esters, nitriles and amides. The comonomers are used in amounts not exceeding 50 mol %, most often 35 mol %, of the mixture of comonomers used in the copolymerization. The process according to the invention is very particularly suitable for the homopolymerization of vinyl chloride.

Radical polymerization in aqueous dispersion with the involvement of radical initiators is understood to denote the well-known aqueous suspension polymerization and aqueous microsuspension polymerization techniques.

In aqueous suspension polymerization, polymerization is carried out with the involvement of liposoluble initiators in the presence of conventional dispersing agents, such as, for example, water-soluble cellulose ethers, partially saponified poly(vinyl acetate)s (also known as "poly(vinyl alcohol)s") and their mixtures. It is also possible, at the same time as the dispersing agents, to use surface-active agents. The amount of dispersing agent used generally varies between 0.7 and 2.0°/oo by weight with respect to the vinyl chloride used.

In aqueous microsuspension polymerization, also sometimes known as homogenized aqueous dispersion polymerization, an emulsion of monomer droplets is produced by virtue of powerful mechanical stirring, generally in the presence of emulsifying agents such as anionic emulsifying agents, and polymerization is carried out with the involvement of liposoluble initiators.

It is particularly advantageous to apply the process of the invention to aqueous suspension polymerization.

Any liposoluble initiator can be used in aqueous microsuspension or suspension polymerization according to the process of the invention, in conventional amounts ranging from approximately 0.5 to 2.0°/oo by weight or even greater amounts, which can reach approximately 4°/oo, with respect to the monomer(s) used. Mention may be made, as examples, of dilauroyl and dibenzoyl peroxides, peroxyesters such as alkyl perpivalates, peroxydicarbonates or alternatively azo compounds. According to a preferred embodiment of the invention, the oil-soluble radical initiator is chosen from dialkyl peroxydicarbonates and more particularly from the dialkyl peroxydicarbonates in which the alkyl groups do not contain more than 6 carbon atoms. Very particularly preferred dialkyl peroxydicarbonates are those in which the alkyl groups do not contain more than 4 carbon atoms. The use of such initiators has many advantages. First, they have a very weak solubility in water but one which is nevertheless sufficient to make possible the manufacture in situ of the preferred strong inorganic inhibitor, in this case iodine, from precursor alkali metal iodides. In addition, the residues or excess of such dialkyl peroxydicarbonates optionally present in the polymerization medium at the end of the cycle and which could affect the thermal stability of the vinyl chloride polymers resulting from the process are easily destroyed by simple basification of the medium at the end of the polymerization cycle. In order to do this, use is made in a way known per se of an alkali metal or ammonium hydroxide, preference being given to the latter whose use has the additional advantage, in comparison with the alkali metal hydroxides, of not affecting the electrical properties of the vinyl chloride polymers.

It is therefore very particularly preferred to apply the process of the invention to the thermal control of the homopolymerization of vinyl chloride in aqueous suspension with the involvement of dialkyl peroxydicarbonates whose alkyl chains do not contain more than 4 carbon atoms and, moreover, to use, as strong inorganic inhibitor for directly controlling the temperature of the polymerization medium, (at least) one alkali metal iodide, which is the precursor of iodine, used in the form of a dilute aqueous solution.

As explained above, the acid pH (here denoting a pH not exceeding 7) is established in some cases naturally as a function of the amount of residual oxygen present in the reactor before polymerization. If necessary, appropriate amounts of non-oxidizing inorganic acid are introduced into the medium to establish the acid pH. Advantageously, a pH of between approximately 3 and 5 is established.

The polymerization temperature is generally between approximately 40° and 80° C. The process according to the invention is particularly appropriate for polymerization at temperatures below 65° C. and more particularly still below 55° C., which are exactly those at which the self-acceleration phenomenon at the end of polymerization is most pronounced. The amount of water used is generally such that the total weight of water represents from 50 to 65% of the total weight of water and monomers.

The vinyl chloride polymers obtained according to the process of the invention are isolated conventionally from their polymerization medium, generally after having been subjected to a purification of residual monomer(s).

The process according to the invention therefore makes possible very exact and easily guided control of the temperature of the polymerization medium, in particular with a view to carrying out the polymerization isothermally, which makes it possible to dispense with the cooling capacity available via the double jacket and which leads to very appreciable productivity gains, most often of the order of 20 or indeed 25%.

Examples which follow are intended to illustrate the invention.

EXAMPLES 1 TO 3

Examples 1 to 3 relate to the aqueous suspension polymerization of vinyl chloride at 53° C. with the involvement of diethyl peroxydicarbonate (EPC) as initiator.

In Example 1 according to the invention, the temperature of the polymerization medium was essentially controlled by direct injection of potassium iodide.

In Example 2, given by way of comparison, a weak inhibitor was used at the start of the polymerization.

In Example 3, also given by way of comparison, no inhibitor was used in the polymerization, so that the temperature of the polymerization medium was controlled solely by the involvement of the cooling water circulating in the double jacket.

In Examples 2 and 3, given by way of comparison, the amounts of initiator were adapted so that the maximum temperature gradient reached during the polymerization cycle is of the same order of magnitude as that achieved in Example 1, the temperature gradient denoting the difference in temperature between the polymerization medium and the cooling water circulating in the double jacket.

EXAMPLE 1

1860 kg of demineralized water, 1.50 kg of poly(vinyl alcohol) and 0.90 kg of diethyl peroxydicarbonate (EPC) are introduced at room temperature and with stirring (50 r/min) into a reactor with a capacity of 3.9 m$^3$ and equipped with a stirrer and with a double jacket. The reactor is closed, stirring is halted and the reactor is placed under a partial vacuum (60 mm Hg absolute) which is maintained for 5 minutes. Stirring is begun (100 r/min) and 1330 kg of vinyl chloride are then introduced. The medium is then heated to 53° C., after which cold water is circulated in the double jacket. The moment at which the polymerization medium reaches 53° C. is regarded as the beginning of the polymerization cycle (=time $t_o$).

At $t_o$+2 hours 15 minutes, when the temperature of the cooling water circulating in the double jacket has reached the threshold of 20° C. (close to the temperature minimum available at this moment), a changeover is made to controlling the temperature of the polymerization medium by controlled injection into the polymerization medium of an aqueous solution containing 1 g/l of potassium iodide.

After operating for 3 h 30 minutes (counted from $t_o$), the pressure in the reactor has fallen by 1.5 kg/cm$^2$. The polymerization is halted by successively: introducing 0.35 kg of ammonia, degassing the unconverted vinyl chloride and cooling. The poly(vinyl chloride) produced is isolated conventionally from the aqueous suspension.

The potassium iodide flow rate in order to keep the temperature of the medium constant moved between 0 and 25 ppm/h and the total amount of iodide injected during the polymerization cycle amounted to 24 ppm.

Table I below repeats the general conditions of the polymerization, namely the nature and dose of initiator, expressed in °/oo, the nature and total dose of inhibitor, expressed in ppm with respect to the vinyl chloride used, the polymerization time at constant pressure and the total time to achieve a pressure fall of 1.5 kg/cm$^2$, and, finally, the mean and maximum temperature gradients, that is to say the mean and maximum temperature differences in degrees C. between the reaction medium, i.e. 53° C. in all the examples, and the temperature of the cooling water circulating in the double jacket. It should be noted that the difference between the maximum gradient and the mean gradient only amounts to a few degrees C. The bulk of the thermal control of the reaction medium is therefore produced by means of the direct injection of the aqueous potassium iodide solution representing, in total, the equivalent of approximately 18 ppm of iodine.

EXAMPLE 2 (COMPARATIVE)

This example conforms in all respects to Example 1, except that in place of controlling the temperature of the reaction medium by injecting a strong inorganic inhibitor, use was made at the beginning of the polymerization of a weak inhibitor, in this case 2,6-di-tert-butyl-p-hydroxytoluene (BHT), incorporated in the initial charge in a proportion of 150 ppm, and that the EPC dose was reduced by 40% (i.e. 0.54 kg) in order to obtain a maximum temperature gradient similar to that obtained in Example 1.

The reaction time necessary for a pressure fall of 1.5 kg/cm$^2$ (cf. Example 1) amounted to 5 h 35 min (cf. Table I).

EXAMPLE 3 (COMPARATIVE)

This example is identical in all respects to Example 1, except that no regulator was used and that the amount of initiator was reduced by 60% (i.e. 0.34 kg) to obtain a maximum temperature gradient similar to that obtained in Example 1.

The total polymerization time (up to a pressure fall of 1.5 kg/cm$^2$) amounted to 6 h 30 min.

EXAMPLES 4 AND 5

Examples 4 and 5 relate to the aqueous suspension polymerization at 53° C. with the involvement of myristyl peroxydicarbonate (MYPC).

In Example 4 according to the invention, the temperature of the polymerization medium was controlled essentially by means of the direct injection of iodine. In Example 5, given by way of comparison, no inhibitor was used and the temperature of the polymerization medium was controlled solely by the involvement of the cooling water circulating in the double jacket.

EXAMPLE 4

This example conforms to Example 1, except that 2.13 kg of MYPC are used.

At $t_o+1$ h 30 min, when the temperature of the cooling water has reached 28° C. (close to the temperature minimum available at this time), the injection of an aqueous solution containing 0.2 g/l of iodine is begun. The total polymerization time corresponding to a pressure fall of 1.5 kg/cm² amounted to 4 h 35 min.

The iodine flow rate varied between 0 and 10 ppm/h and the total amount of iodine injected amounted to 18 ppm.

EXAMPLE 5 (COMPARATIVE)

This example conforms to Example 4, except that it is carried out in the absence of any inhibitor and that the amount of MYPC initiator was reduced by approximately 50% (i.e. 1.05 kg).

The total polymerization time up to a pressure fall of 1.5 kg/cm² amounted to 6 h 15 minutes (cf. Table I).

Comparison of the results of Examples 1 and 4 with those of Comparison Examples 2, 3 and 5 respectively make clearly apparent the very substantial gain in productivity of the reactor provided by the process according to the invention.

The thermal stability at 190° C. of the poly(vinyl chloride)s resulting from Examples 1 and 3 (comparative) was evaluated on crêpes obtained by mixing the following composition in a roller mixer for 30 min at 180° C.:

| Constituent | Parts by weight |
| --- | --- |
| Poly(vinyl chloride) | 100 |
| Dioctyl phthalate | 60 |
| Processing aid | 2 |
| Lubricant | 0.2 |
| Octyltin stabilizer | 2 |

The thermal stability at 190° C. of the composition comprising poly(vinyl chloride) produced according to Example 1 amounts to 38 min and that of the composition comprising poly(vinyl chloride) produced in Comparative Example 3 amounts to 36 min.

The thermal stability at 190° C., expressed in minutes, represents the time for which the crêpe is held at 190° C. before it darkens.

TABLE 1

| Ex. No. | Initiator Nature | Dose (°/oo) | Inhibitor Nature | Dose (ppm) | Pol. time at constant pressure | total | Temp. gradient (°C.) mean | max. |
| --- | --- | --- | --- | --- | --- | --- | --- | --- |
| 1 | EPC | 0.68 | KI | 24 | 3 h 20 min | 3 h 50 min | 26.5 | 33 |
| 2 | EPC | 0.41 | BHT | 150 | 4 h 45 min | 5 h 35 min | 18.3 | 31 |
| 3 | EPC | 0.26 | none | none | 5 h 10 min | 6 h 30 min | 15.0 | 30 |
| 4 | MYPC | 1.60 | I₂ | 18 | 4 h 10 min | 4 h 35 min | 21.1 | 31 |
| 5 | MYPC | 0.78 | none | none | 5 h 30 min | 6 h 15 min | 15.7 | 31 |

We claim:

1. Process for the radical polymerization of vinyl chloride at acid pH in aqueous dispersion with the involvement of oil-soluble initiators, characterized in that the temperature of the polymerization medium is essentially controlled by direct and modified injection of an effective amount of a strong inorganic inhibitor of the radical polymerization or a precursor of such an inhibitor.

2. Process for the radical polymerization of vinyl chloride according to claim 1, characterized in that the strong inorganic inhibitor is chosen from iodine, nitrogen monoxide and their respective alkali metal iodide and nitrite precursors.

3. Process for the radical polymerization of vinyl chloride according to claim 2, characterized in that the strong inorganic inhibitor is chosen from alkali metal iodides and nitrites, which are the respective precursors of iodine and of nitrogen monoxide.

4. Process for the radical polymerization of vinyl chloride according to claim 3, characterized in that the strong inorganic inhibitor is chosen from alkali metal iodides, which are precursors of iodine.

5. Process for the radical polymerization of vinyl chloride according to claim 1, characterized in that the strong inorganic inhibitor or its precursor are used in the form of dilute aqueous solutions.

6. Process for the radical polymerization of vinyl chloride according to claim 1, characterized in that the overall amount of strong inorganic inhibitor used in the course of a polymerization cycle does not exceed approximately 75 ppm or the equivalent amount of precursor with respect to the vinyl chloride.

7. Process for the radical polymerization of vinyl chloride according to claim 1, characterized in that the overall amount of strong inorganic inhibitor used in the course of a polymerization cycle amounts to at least approximately 2 ppm or the equivalent amount of precursor with respect to the vinyl chloride.

8. Process for the radical polymerization of vinyl chloride according to claim 1, characterized in that it is applied to aqueous suspension polymerization.

9. Process for the radical polymerization of vinyl chloride according to claim 1, characterized in that it is applied to the polymerization with the involvement of oil-soluble initiators chosen from dialkyl peroxydicarbonates whose alkyl groups do not contain more than 6 carbon atoms.

* * * * *